United States Patent
Koyama et al.

(10) Patent No.: US 10,747,425 B2
(45) Date of Patent: Aug. 18, 2020

(54) TOUCH OPERATION INPUT DEVICE, TOUCH OPERATION INPUT METHOD AND PROGRAM

(71) Applicant: Sharp Kabushiki Kaisha, Sakai, Osaka (JP)

(72) Inventors: Noriyuki Koyama, Sakai (JP); Kenji Akitomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/432,188

(22) Filed: Jun. 5, 2019

(65) Prior Publication Data

US 2019/0286314 A1   Sep. 19, 2019

Related U.S. Application Data

(63) Continuation of application No. 15/672,361, filed on Aug. 9, 2017, now Pat. No. 10,353,578, which is a (Continued)

(30) Foreign Application Priority Data

Apr. 17, 2014 (JP) .................. 2014-085306

(51) Int. Cl.
*G06F 3/0482* (2013.01)
*G06F 3/0488* (2013.01)
*G06F 3/041* (2006.01)

(52) U.S. Cl.
CPC ........ *G06F 3/04883* (2013.01); *G06F 3/0416* (2013.01); *G06F 3/0482* (2013.01)

(58) Field of Classification Search
CPC .................. G06F 3/04883; G06F 3/0416
(Continued)

(56) References Cited

U.S. PATENT DOCUMENTS 6,496,191 B2 * 12/2002 Asai ...................... G06F 40/109
345/467
8,907,907 B2 * 12/2014 Kawasaki ............ G06F 3/03545
345/173

(Continued)

OTHER PUBLICATIONS

Koyama et al., "Touch Operation Input Device, Touch Operation Input Method and Program", U.S. Appl. No. 15/672,361, filed Aug. 9, 2017.

*Primary Examiner* — William D Titcomb
(74) *Attorney, Agent, or Firm* — Keating & Bennett, LLP

(57) ABSTRACT

A touch operation input device that allows input by a touch operation to a display screen, has a touch operation detector for detecting a touch operation; an operation processor for performing a process by determining operated content based on a detection result of the touch operation detector; a menu processor for performing a menu displaying process and a process of a menu item, based on a determination result of the operation processor; an image processor for performing a process of generating a drawn image on a touched portion when in a drawing mode; and a display controller for performing control of display on a display screen. When the operation processor has determined the touch operation as an operation for a menu process, the image processor performs a process of erasing the drawn image drawn by the touch operation even in the drawing mode.

7 Claims, 9 Drawing Sheets

Related U.S. Application Data continuation of application No. 14/676,017, filed on Apr. 1, 2015, now Pat. No. 9,760,279.

(58) Field of Classification Search
USPC .......................................................... 715/810
See application file for complete search history.

(56) References Cited

U.S. PATENT DOCUMENTS

| | | | | |
|---|---|---|---|---|
| 9,329,706 B2* | 5/2016 | Kawasaki | ........... | G06F 3/03545 |
| 9,760,279 B2* | 9/2017 | Koyama | ............. | G06F 3/04883 |
| 10,353,578 B2* | 7/2019 | Koyama | ............. | G06F 3/04883 |

* cited by examiner

TOUCH OPERATION INPUT DEVICE, TOUCH OPERATION INPUT METHOD AND PROGRAM

This Nonprovisional application claims priority under 35 U.S.C. § 119 (a) on Patent Application No. 2014-085306 filed in Japan on 17 Apr. 2014, the entire contents of which are hereby incorporated by reference.

BACKGROUND OF THE INVENTION

(1) Field of the Invention

The present invention relates to a touch operation input device, touch operation input method and program in which menu is displayed in drawing mode by performing a touching operation so as to select and input an operation item.

(2) Description of the Prior Art

Recently, touch operation input devices such as tablet terminals, electronic blackboards and the like that allow the user to input by touching operation have appeared. In input operation in such the touch operation input device, an operation menu is displayed so that the user can operate the device intuitively. Examples of how the operation menu is displayed include a type in which the operation menu is constantly displayed at an edge of the touch operation input device and a type in which the operation menu is called up only when needed in order to allow the use of the display screen as wide as possible. For example, Patent Document 1 discloses a device that displays a menu when the screen is long pressed by a pen.

[Patent Document 1] Japanese Patent Application Laid-open H08-286829

However, when a menu is made to appear by a long press of a pen in drawing mode, the stoke trace (spot) of the pen remains at the area where the pen is long pressed on the screen. Further, even when the menu is cancelled by a long press, the stroke also remains. As a result, the user has to erase the stroke trace (spot) every time it is drawn, causing inconvenience.

SUMMARY OF THE INVENTION

In view of the above circumstances, it is therefore an object of the present invention to provide a touch operation input device, touch operation input method and program in which no image of a trace as a result of a touch will be displayed when in drawing mode a menu process is performed by the touch operation.

According to the present invention, a touch operation input device that allows input by a touch operation to a display screen, includes: a touch operation detector configured to detect a touch operation; an operation processor configured to perform a process by determining operated content based on a detection result of the touch operation detector; a menu processor configured to perform a menu displaying process and a process of a menu item, based on a determination result of the operation processor; an image processor configured to perform a process of generating a drawn image on a touched portion when in a drawing mode; and a display controller configured to perform control of display on a display screen, wherein when the operation processor has determined the touch operation as an operation for a menu process, the image processor performs a process of erasing the drawn image drawn by the touch operation even in the drawing mode.

Here, the operation processor is characterized in that to determine a touch as a menu processing operation when the touch is in a long pressing state in which the touch continues for a fixed period of time or longer and a movement distance of the touch is shorter than a predetermined distance.

The image processor may erase the drawn image when a touch-up releasing the touch is detected by the touch operation detector.

According to the present invention, a touch operation input method that allows input by a touch operation to a display screen, includes: a touch operation detecting step of detecting a touch operation; an operation processing step of performing a process by determining operated content based on a detection result by the touch operation detecting step; a menu processing step of performing a menu displaying process and a process of a menu item, based on a determination result by the operation processing step; an image processing step of performing a process of generating a drawn image on a touched portion when in a drawing mode; and a display controlling step of performing control of display on a display screen, wherein when the touch operation has been determined to be an operation for a menu process in the operation processing step, a process of erasing the drawn image drawn by the touch operation is performed in the image process step even when in the drawing mode.

The present invention resides in a non-transitory recording medium recording a program for causing a computer to execute the steps of the above-described touch operation input method.

Advantages of the Invention

According to the present invention, even in the drawing mode, since no drawn image will be displayed at the touched area when a touch is performed for a menu process, it is possible to avoid the menu being hard to read due to residue of the drawn image and it is no longer necessary for the user to erase the drawn image.

DESCRIPTION OF THE PREFERRED EMBODIMENTS

The embodiment of the present invention will hereinafter be described with reference to the accompanying drawings.

Figure 1:
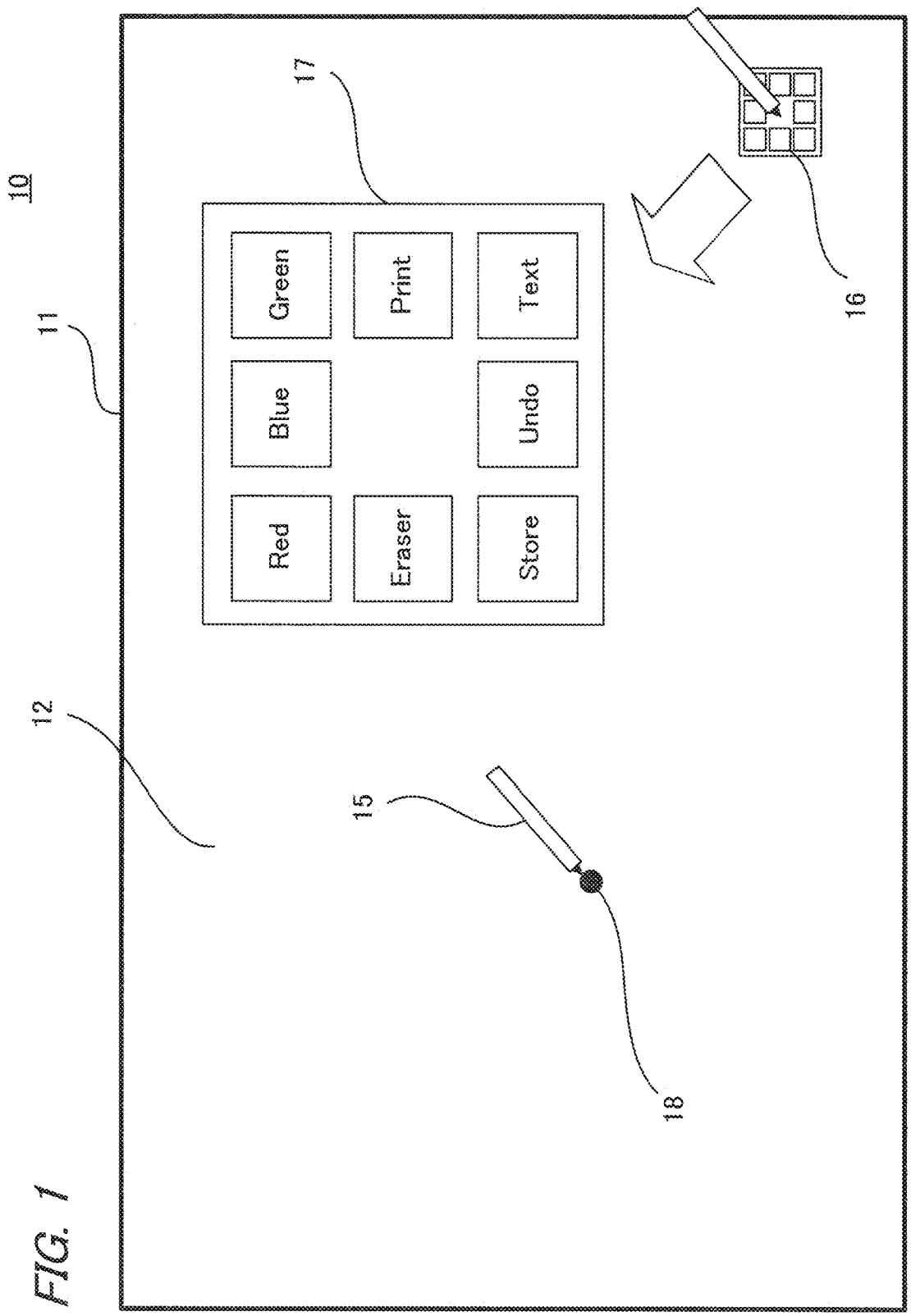
FIG. 1 is an appearance view of a touch operation input device according to the present invention.

FIG. 1 is an appearance view of the touch operation input device according to the present invention.

As shown in FIG. 1, a touch operation input device 10 contains a display portion 11 and a touch operation detector 12. Display portion 11 forms a display screen with a liquid crystal display screen, an organic electroluminescence screen or the like. This display portion 11 has a large screen to be used for presentations, television conferences and so on. Here, the display portion may also be a portable-sized one such as a tablet terminal that can be operated by touching.

Touch operation detector 12 is implemented on a surface of display portion 11 to provide a function detecting the position of a user's touch. Display portion 11 and touch operation detector 12 integrally form a touch panel so as to allow input by touching the display on the screen. Though this touch panel may use various kinds of technologies such as infrared ray touch technology and capacitive touch technology, any technology may be used as long as the panel can detect the touch position. Further, in this embodiment input is effected by use of a touch pen 15, but input may be performed by use of user's hand.

When the touch operation input device of FIG. 1 is set in drawing mode, a line is drawn by a touch stroke of touch pen 15. As in the figure, if a touch remains at a single point, a spot 18 is displayed. This display portion 11 is a large screen and if, for example the operation menu is displayed at the left edge, the user has to bring the pen to that position each time. Thus, an indicator menu 16 is constantly displayed. This indicator menu 16 moves to a place at which touch pen 15 has been pressed down for a fixed long time. When touch pen 15 is touched down on inside indicator menu 16, a square menu 17 is adapted to open. This square menu 17 has icons representing individual operation items arranged along the insides of the square so that the user can select a desired operation item.

Figure 2:
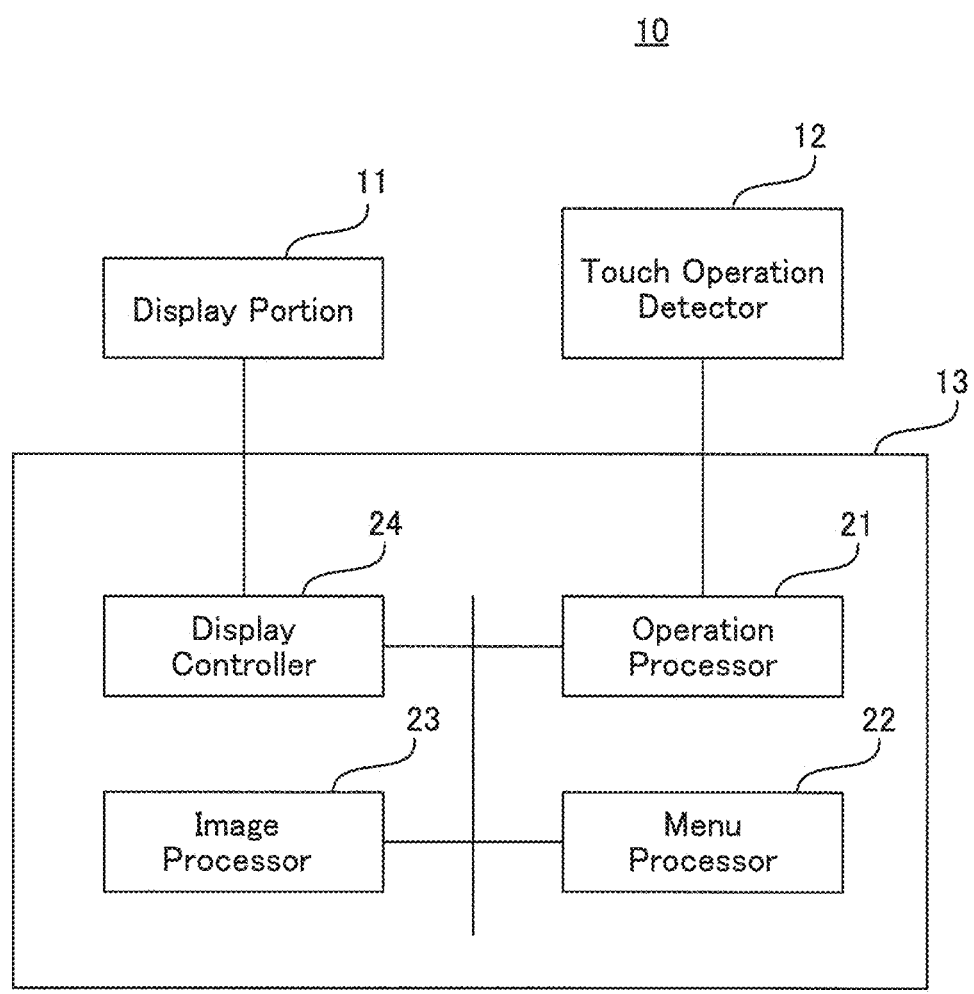
FIG. 2 is a block diagram showing one example of the touch operation input device.

FIG. 2 is a block diagram showing one example of a touch operation input device.

This touch operation input device 10 contains display portion 11, touch operation detector 12 and a controller 13. This touch operation input device 10 has various functions, but FIG. 2 only depicts the functional blocks relating to the menu process. Controller 13 is configured of an operation processor 21, a menu processor 22, an image processor 23 and a display controller 24.

Display portion 11 and touch operation detector 12 are as described above.

Operation processor 21 processes the input signal from touch operation detector 12, determines the input content by calculating the position of the input, the moving direction of the input, input time and the like, and outputs operation instructing signals to each block.

Menu processor 22, following the operation instruction signals from operation processor 21, performs a menu displaying process. Specifically, the menu processor performs processes relating to display of indicator menu 16 and square menu 17. The menu processor also performs processes relating to the items displayed as the menu.

Image processor 23, following the operation instructing signals from operation processor 21, performs a process of generating a drawn image in drawing mode. That is, the image processor generates a drawn image of a touch stroke by touch pen 15.

Display controller 24, based on the processed data by menu processor 22 and image processor 23, controls so as to display the image of the data on display portion 11

The First Embodiment

Figure 3:
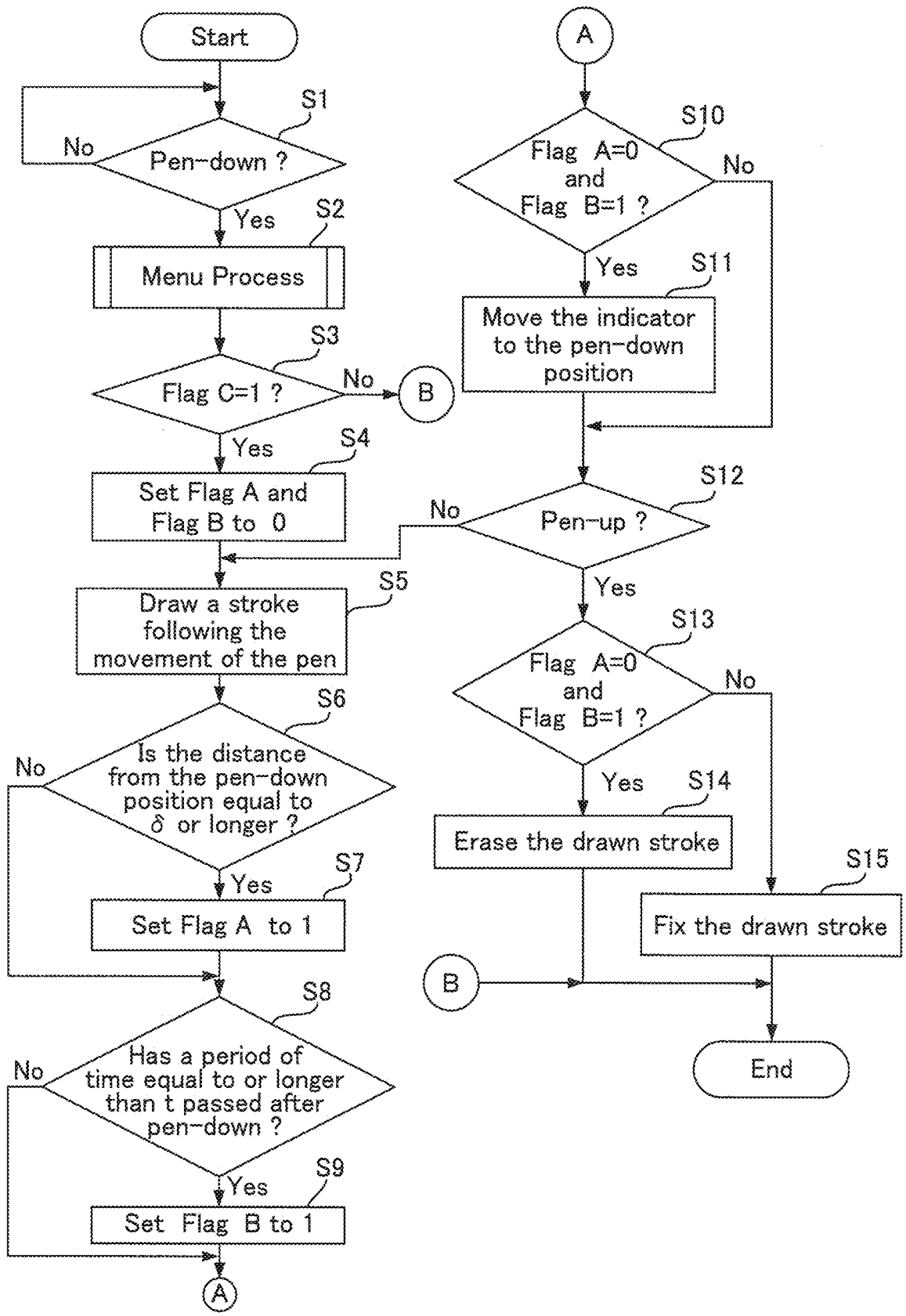
FIG. 3 is a flowchart showing a process of drawing mode in the first embodiment of the touch operation input device according to the present invention.
Figure 4:
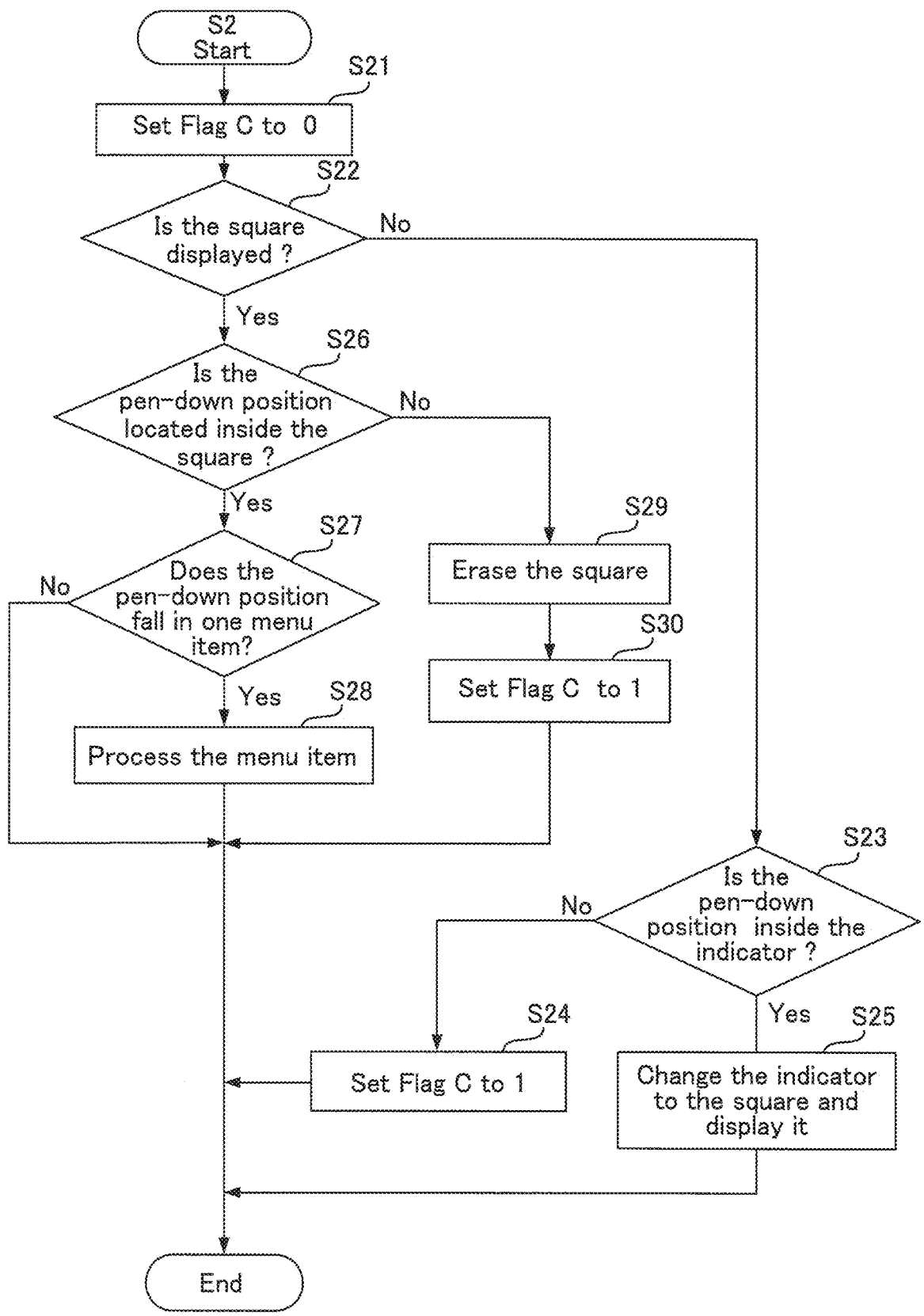
FIG. 4 is a flow chart showing a menu process in the first embodiment of the touch operation input device according to the present invention.

FIG. 3 is a flow chart showing a process of drawing mode in the first embodiment of the touch operation input device according to the present invention. FIG. 4 is a flow chart showing the menu process.

In drawing mode, a line image is formed following a stroke of a touch operation. However, when a menu display operation is performed, a line is also drawn along the stroke. This drawing is actually the part that is unwanted to be drawn, so that an erasing process of this part is performed.

The first embodiment shows a configuration that is applied to a case where a single touch pen 15 (FIG. 1) is used.

In drawing mode, operation processor 21 (FIG. 2) checks whether touch operation detector 12 (FIGS. 1 and 2) has detected a landing of touch pen 15 (Step S1). Then, touch operation input device 10 (FIGS. 1 and 2) performs a menu process (Step S2).

As shown in FIG. 4, operation processor 21 sets a flag C to 0 (Step S21). Next, menu processor 22 (FIG. 2) checks whether square menu 17 (FIG. 1) has been displayed (Step S22).

If not, operation processor 21 checks whether the pen-down position resides inside indicator menu 16 (FIG. 1) (Step S23).

If the pen-down position is located outside indicator menu 16, menu processor 22 sets flag C to 1 (Step S24).

When the pen-down position resides inside indicator menu 16, menu processor 22 changes indicator menu 16 to square menu 17 and causes display controller 24 (FIG. 2) to display square menu 17 on display portion 11 (Step S25).

Figure 5:
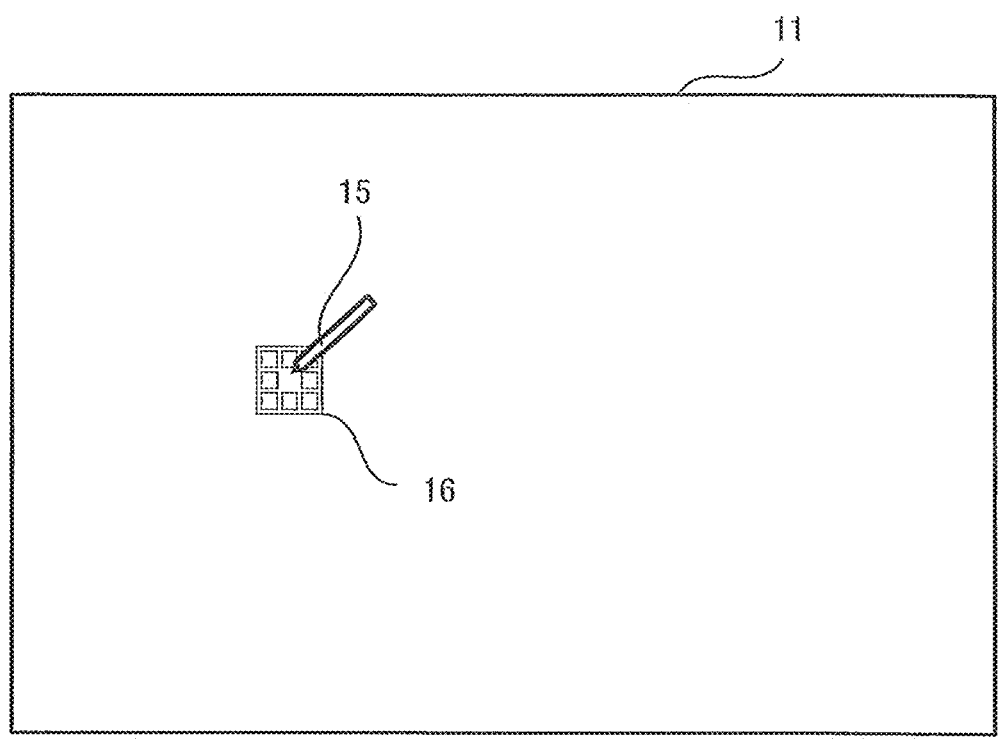
FIG. 5 is an illustrative view showing display of an indicator menu in the first embodiment of the touch operation input device according to the present invention.
Figure 6:
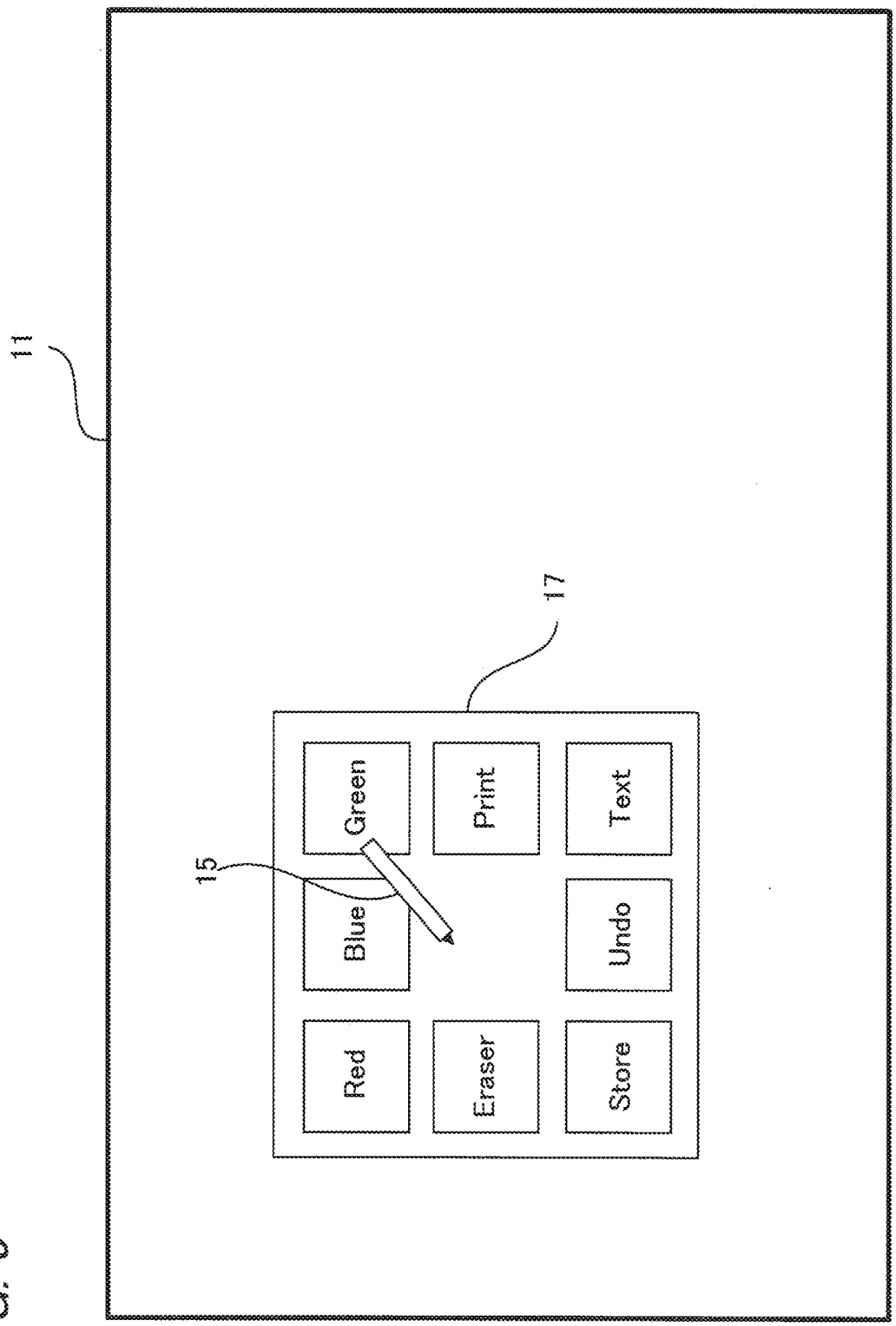
FIG. 6 is an illustrative view showing display of a square menu in the first embodiment of the touch operation input device according to the present invention.

For example, as shown in FIG. 5, when touch pen 15 touches indicator menu 16, indicator menu 16 changes into square menu 17 as shown in FIG. 6.

When square menu 17 has been displayed, operation processor 21 (FIG. 2) checks whether the pen-down position resides inside square menu 17 (Step S26).

If the pen-down position resides inside the square menu, operation processor 21 checks whether the pen-down position falls in one of the menu items (Step S27). If the pen-down position falls in one of the menu items (S27=Yes), menu processor 22 (FIG. 2) performs the process of the menu item (Step S28).

If the pen-down position is outside square menu 17 (S27=No), menu processor 22 erases square menu 17 (Step S29). Then, menu processor 22 sets flag C to 1 (Step 30).

After completion of the menu process, operation processor 21 (FIG. 2) checks whether flag C is 1 (Step S3) (FIG. 3). If the flag is 1 (S3=Yes), the control goes to Step S4, whereas if flag C is not 1 (S3=No), the process is ended. That is, when flag C is 1, the following procedures exist, whereas flag C being 0 means no following procedures.

When Step S3 is affirmative (Yes), if touch pen 15 (FIG. 1) is placed down touching display portion 11 (FIG. 1), flags A and B are set to 0 (Step S4) (FIG. 3). Because of drawing mode, image processor 23 (FIG. 2) generates an image of depicting the stroke as touch pen 15 moves while touching display portion 11. Then, display controller 24 (FIG. 2) displays the generated image on display portion 11 (Step S5).

Figure 7:
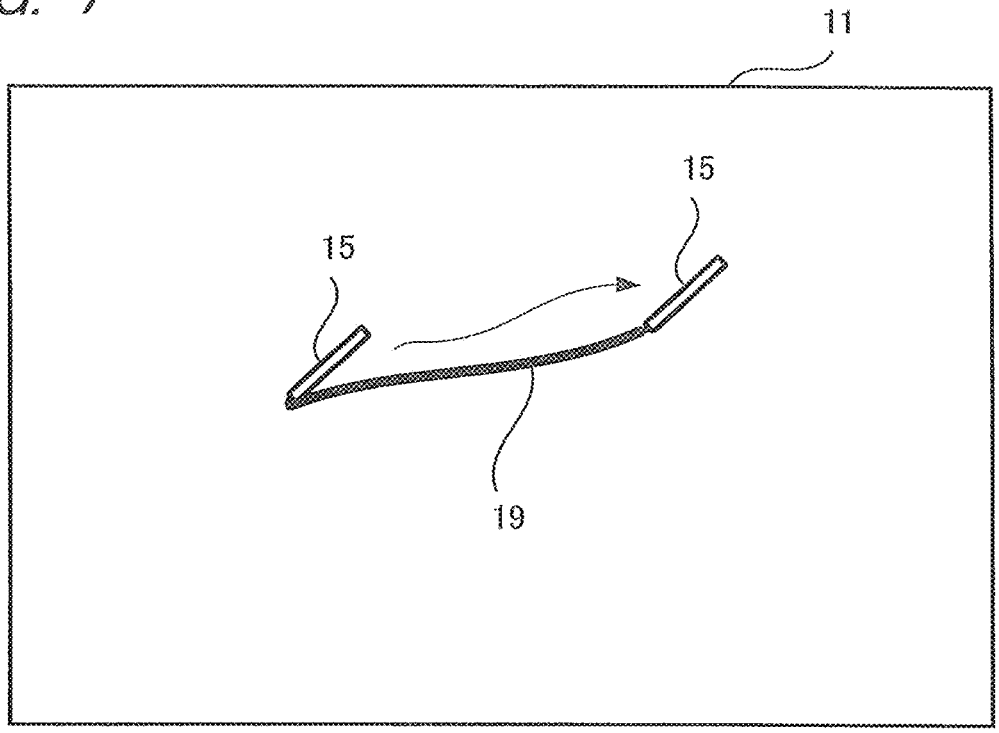
FIG. 7 is a view showing a drawn stroke in the first embodiment of the touch operation input device according to the present invention.

When touch pen 15 does not move to perform a long press, the stoke is depicted as a spot 18 as shown in FIG. 1. When touch pen 15 moves touching display portion 11, a line 19 is drawn as shown in FIG. 7.

Operation processor 21 (FIG. 2) continuously detects the position of touch from the detection result of touch operation detector 12 (FIGS. 1 and 2) to determine whether the distance of the touch from the pen-down position is equal to or longer than δ (Step S6). When the distance of touch is equal to or longer than δ, flag A is set to 1 (Step S7). When the distance of touch from the pen-down position is shorter than δ, flag A remains at 0. Since this distance δ is to detect a long press of touch pen 15, δ is set as much as 1 to 2 mm, for example.

Next, operation processor 21 determines whether the period of touch after pen-down is equal to or longer than t (Step S8). When the period of touch is equal to or longer than t, flag B is set to 1 (Step S9). When the period of touch is shorter than t, flag B remains at 0 (Step S9). This period t is to detect a long press of touch pen 15, so that t is set as much as 2 to 5 seconds, for example.

Touch distance δ and touch period t may be settable in advance by the user or others.

Next, operation processor 21 determines whether the touch operation is a long press. Specifically, it is determined whether flag A is 0 and flag B is 1 (Step S10) (FIG. 3). When flags A and B satisfy the above conditions, touch pen 15 can be determined to be long pressed. As a result, operation processor 21 determines that a menu processing operation (operation of moving menu) has been instructed, and menu processor 22 moves indicator menu 16 (FIG. 1) to the pen-down position (Step S11) (FIG. 3).

Figure 8:
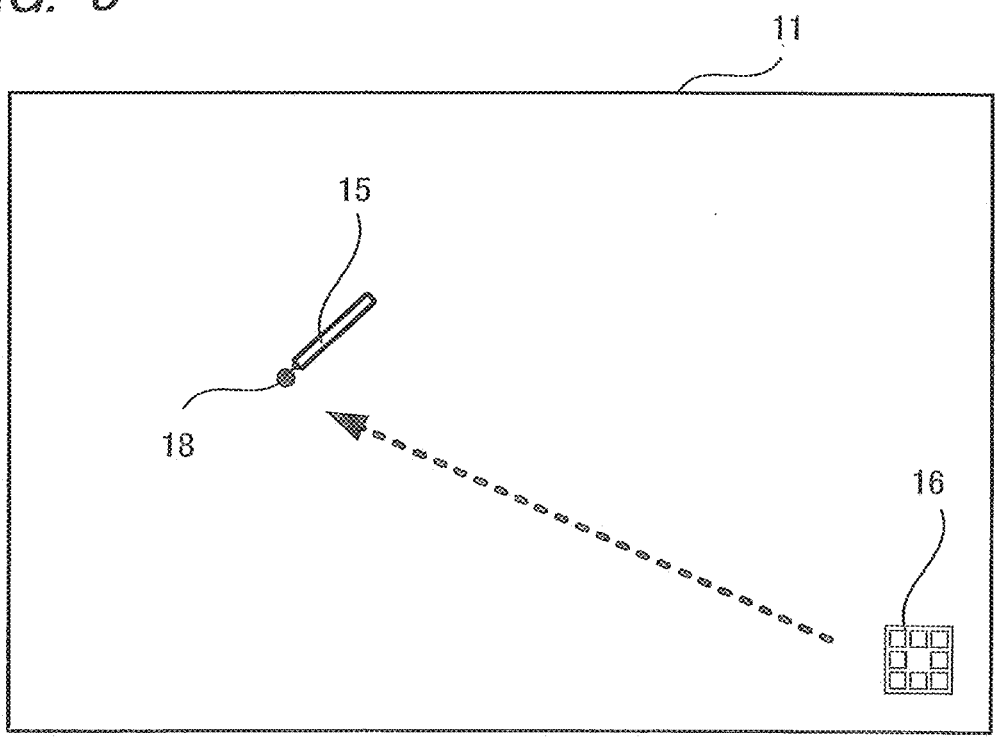
FIG. 8 is an illustrative view showing movement of an indicator menu as a result of a long press in the first embodiment of the touch operation input device according to the present invention.
Figure 9:
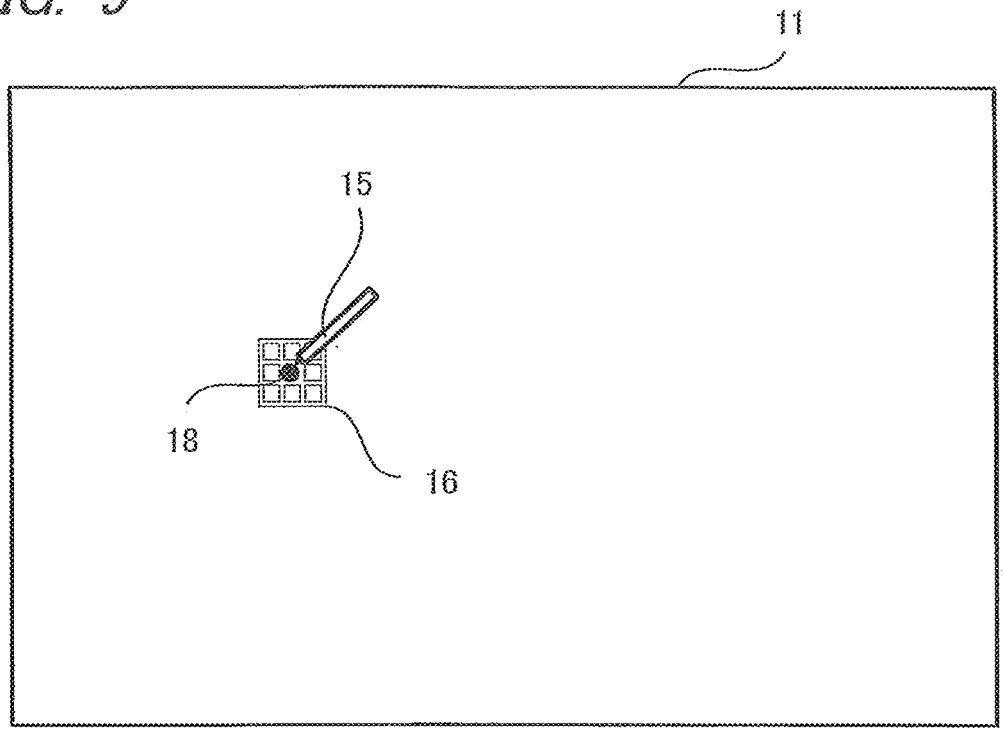
FIG. 9 is an illustrative view showing display of an indicator menu and a drawn stroke as a result of a long press in the first embodiment of the touch operation input device according to the present invention.

As shown in FIG. 8 it is assumed that indicator menu 16 is displayed at the lower right corner of display portion 11. When touch pen 15 is touched and long pressed on the screen in drawing mode, spot 18 is displayed as a stroke, at the same time indicator menu 16 moves to the pen-down position of touch pen 15. Then, indicator 16 and spot 18 are displayed at the pen-down position of touch pen 15 as shown in FIG. 9.

Figure 10:
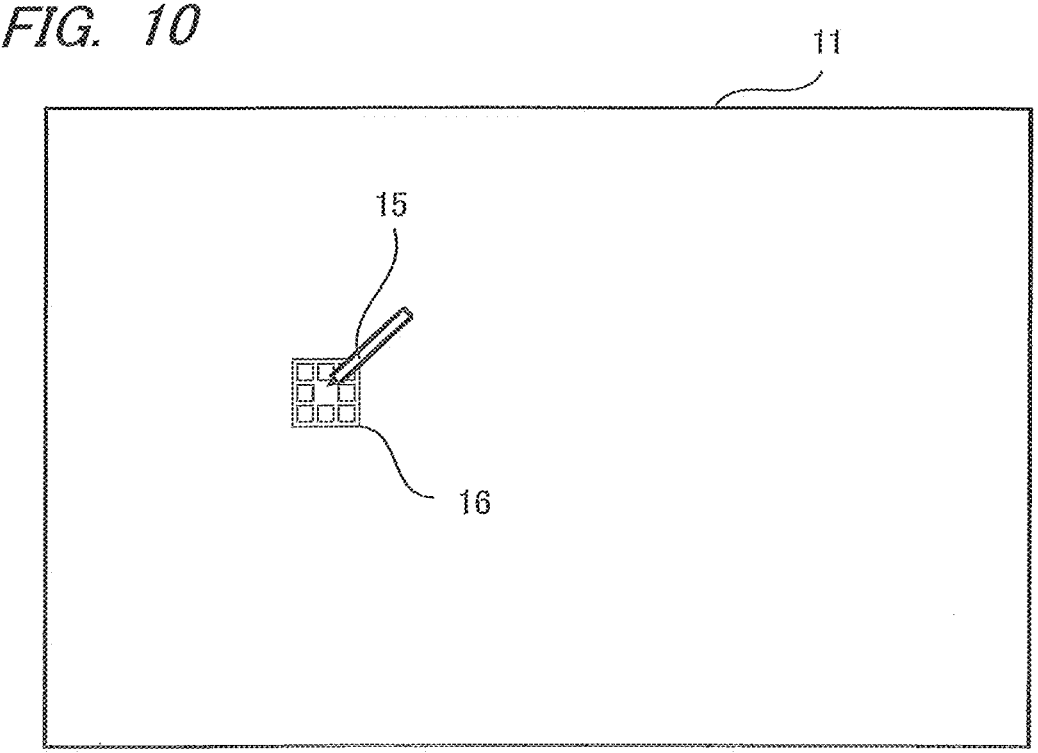
FIG. 10 is an illustrative view showing display of an indicator menu in which the drawn stroke has been deleted due to a result of a long press in the first embodiment of the touch operation input device according to the present invention.

Next, operation processor 21 determines whether pen-up of touch pen 15 has been performed (Step S12) (FIG. 3). When pen-up has been performed, it is determined whether flag A is 0 and flag B is 1 (long press by the pen) (Step S13). If flags A and B satisfy the above conditions, image processor 23 erases the drawn stroke (spot 18) that has been formed by the touch operation for instructing a menu process (Step S14) (FIG. 3), as shown in FIG. 10. If flags A and B do not satisfy the above conditions, image processor 23 fixes the drawn stroke (Step S15).

In this way, for a menu movement process resulting from a long press, no drawn stroke (image of a spot) will be displayed at the time of pen-up. Accordingly, there is no risk that the menu becomes hard to see because of the drawn stoke being left, and there is no necessity for the user to erase the drawn stoke. Additionally, when the pen is long pressed, the drawn stroke remains until pen-up. However, this image is located in the touched area, hence hidden by the touch pen, so that there occurs no particular problem even though it is displayed.

Further, there are cases where a stroke cannot be distinguished between part of a drawing process and a long press for a menu process until a certain period of time has elapsed. In such a case, a drawing process is performed for the time being, and when the stroke is determined to be part of a menu process after an elapse of a certain period of time, the drawn image is left as is and then erased at the time of pen-up.

In the above embodiment, a touch operation, i.e., "long press", is used to perform a menu moving process and delete the drawn stoke. However, the present invention should be limited to this. The menu process including the menu moving process may be activated by other touch operations. Though in this embodiment, erasure of the drawn image is performed at the time of pen-up, the drawn image may be erased right after a stroke is determined as a menu process.

The Second Embodiment

Figure 11:
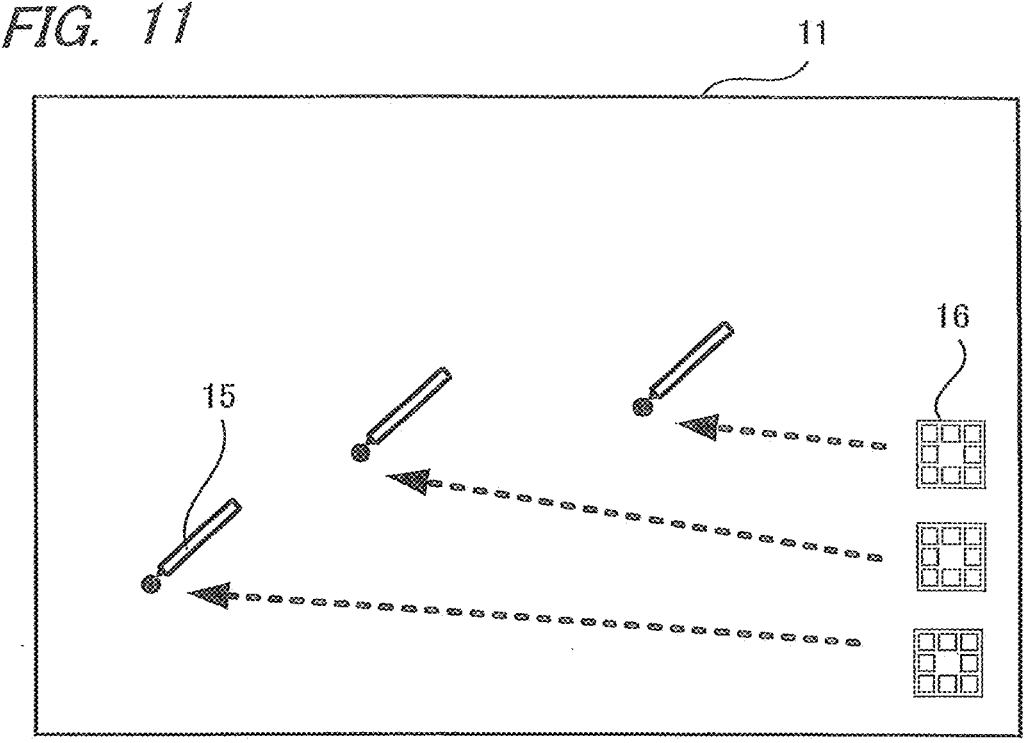
FIG. 11 is an illustrative view showing display of indicator menus and drawn strokes as a result of long pressing in a second embodiment of a touch operation input device according to the present invention; and, FIG. 12 is an illustrative view showing display of indicator menus in the second embodiment of the touch operation input device according to the present invention.
Figure 12:
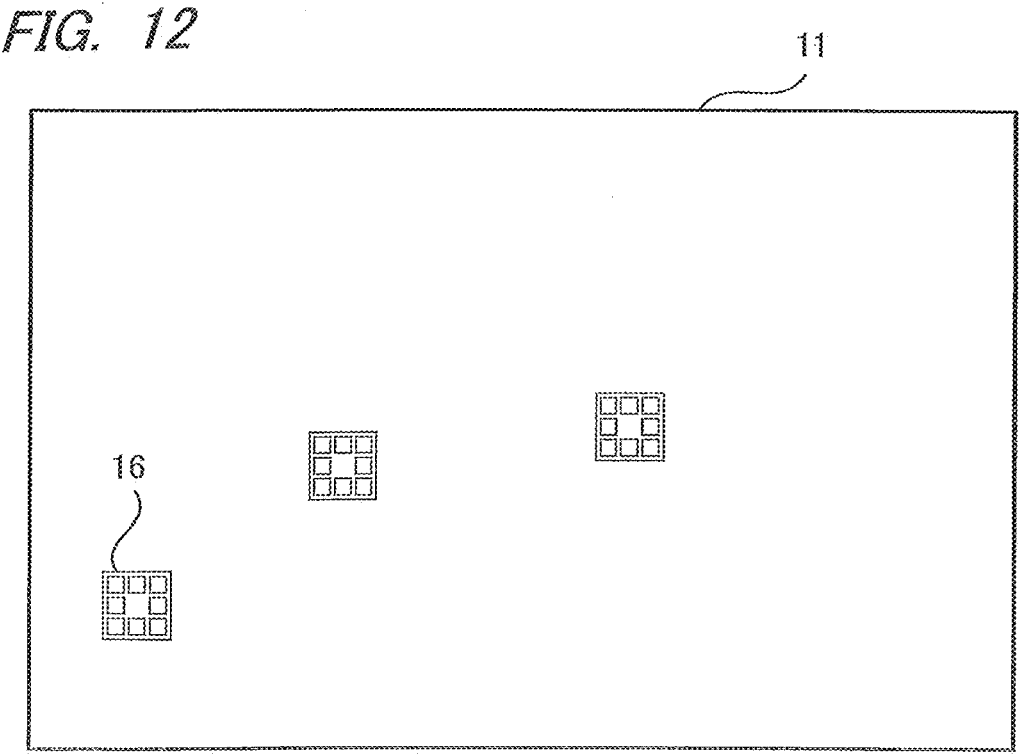

FIGS. 11 and 12 are illustrative views showing a menu control process in the second embodiment of a touch operation input device according to the present invention.

This configuration includes a plurality of pens and a plurality of users, each having the pen, can perform different operations at the same time. In this embodiment, there are three pens for three users, and indicator menu 16 exists for each.

Though not illustrated, a square menu exists corresponding to each indicator menu 16. Each of the square menus can be displayed individually and erased separately. The menu items of each square menu may be the same as, or different from, those of the others.

The control as to menus is performed by each touch pen, following the flow charts shown in FIGS. 3 and 4.

For example, as shown in FIG. 11, when the screen is long pressed by each touch pen 15, each indicator menu 16 corresponding to each touch pen 15 moves to the pen-down position of the touch pen 15. In this state, when the pen is lifted, the drawn stroke is erased as shown in FIG. 12 so that indicator menu 16 alone is displayed.

In the above way, the process with the plurality of touch pens can be performed in the same manner as a single touch pen is used, so that a drawn stroke after a long press in drawing mode can be erased as the pen is lifted. As a result, it is possible to avoid the menu becoming hard to see and it is not necessary for the user to erase the drawn stoke.

The program to be operated in touch operation input device according to the present invention may be a program (program that makes a computer function) for controlling a CPU (Central Processing Unit) or the like so as to realize the functions of the above-described embodiment relating to the present invention. The information to be handed in these apparatus is temporarily stored in RAM (Random Access Memory) at the time of processing, then is stored into various kinds of ROM such as Flash ROM (Read Only Memory) etc., or a HDD (Hard Disk Drive), and is read out, modified and written in by the CPU, as necessary. Further, the program to realize the function of each configuration may be recorded in a computer-readable recording medium so as to cause a computer system to read the program recorded on this recording medium, whereby the computer system executes the program to implement the function of each unit. The "computer system" herein is assumed to include an OS and hardware such as peripheral device and the like.

Moreover, the "computer-readable recording medium" may be a removable medium such as flexible disk, magneto-optical disk, ROM, CD-ROM and the like, or a storage device such as a hard disk or the like that is built in the computer system. Further, the above program may be one that realizes part of the above-described functions, or may be one that can realize the above-described functions in combination with the programs that have been already recorded in the computer system.

As the invention have been described in detail, the specific configuration should not be limited to the embodiments. Designs and others that do not depart from the gist of this invention should also be included in the scope of claims.

DESCRIPTION OF REFERENCE NUMERALS

10: touch operation input device
11: display portion
12: touch operation detector
13: controller
15: touch pen
16: indicator menu
17: square menu
18: stroke (spot)
19: stroke (line)
21: operation processor
22: menu processor
23: image processor
24: display controller

What is claimed is:

1. A display device that allows input by a touch operation to a display screen, the display device comprising:
   a touch operation detector configured to detect a touch operation;
   an operation determination processor configured to determine operation content based on a detected result of the touch operation detector;
   an image processor configured to perform a process of generating a drawn image based on a detected position of the touch operation detector; and
   a display controller configured to control a display of the drawn image generated by the image processor and a display of a menu on the display screen, wherein
   when the operation determination processor determines the touch operation as a moving operation of the menu, the display controller erases the drawn image generated by the moving operation of the menu.

2. The display device according to claim 1, wherein when the moving operation of the menu is released, the display controller erases the drawn image displayed by the moving operation of the menu.

3. The display device according to claim 1, wherein the moving operation of the menu includes a long pressing operation in which the touch continues for a fixed period of time or longer and a movement distance of the touch is shorter than a predetermined distance.

4. The display device according to claim 1, wherein the menu is configured such that a desired operation item is capable of being selected by a user and such that a display mode of an operation menu in which a plurality of icons corresponding to a plurality of operation items are arranged is changed.

5. The display device according to claim 4, wherein when a touch operation to the menu whose display mode is changed is detected, the menu whose display mode has been changed is returned to the operation menu.

6. A display controlling method that allows input by a touch operation to a display screen, the display controlling method comprising:
   detecting a touch operation;
   determining operation content based on a detected result of the detecting;
   performing a process of generating a drawn image based on a detected position of the touch operation; and
   controlling a display of the drawn image and a display of a menu on the display screen, wherein
   when the touch operation is determined as a moving operation of the menu in the determining, the drawn image generated by the moving operation of the menu is erased in the controlling.

7. A non-transitory recording medium storing a program for causing a computer mounted on a display device that allows input by a touch operation to a display screen, to execute a process comprising:
   detecting a touch operation;
   determining operation content based on a detected result of the touch operation;
   performing a process of generating a drawn image based on a detected position of the touch operation; and
   controlling a display of the drawn image and a display of a menu on the display screen, wherein
   when the touch operation is determined as a moving operation of the menu in the determining, the drawn image generated by the moving operation of the menu is erased in the controlling.

* * * * *